J. STEGER.
FRICTION PULLEY.

No. 108,533. Patented Oct. 18, 1870.

United States Patent Office.

JOSEPH STEGER, OF NEW YORK, N. Y.

Letters Patent No. 108,533, dated October 18, 1870.

IMPROVEMENT IN FRICTION-PULLEYS.

The Schedule referred to in these Letters Patent and making part of the same.

*To all whom it may concern:*

Be it known that I, JOSEPH STEGER, of the city, county, and State of New York, have invented a new and improved Friction-Pulley; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
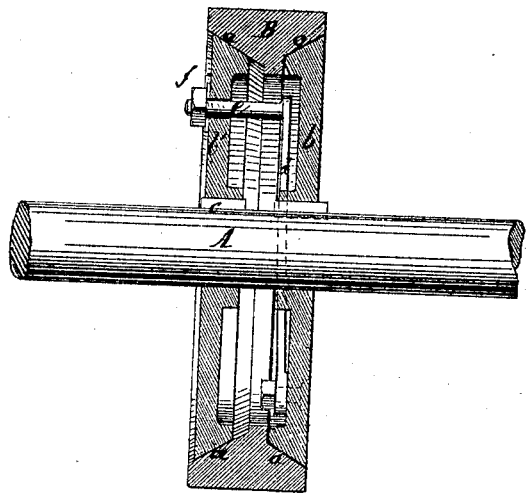
Figure 1 represents a transverse section of this invention.
Figure 2:
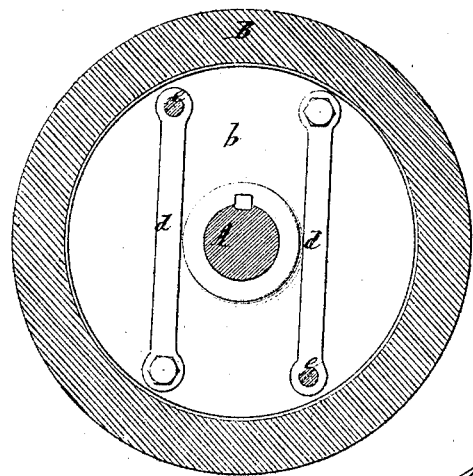
Figure 2 is a sectional front view of the same.

This invention relates to a pulley, which is provided with two internal cone seats, fitting on two disks, which are mounted on the shaft of the pulley, so that they can be moved thereon toward and from each other, but that they cannot revolve independent of said shaft, and one of which is provided with spring-bolts extending through the other in such a manner that, by tightening said bolts, a uniform pressure is exerted on both seats in the pulley, thereby preventing its face from being thrown in an oblique position; and, furthermore, the friction exerted by the disks on the pulley, and consequently the power transmitted by said pulley, can be regulated at pleasure.

In the drawing—

The letter A designates a shaft, on which is mounted my friction-pulley B. This pulley is provided with two internal conical seats, $a$, which fit on corresponding conical disks, $b\ b'$, as shown in fig. 1 of the drawing.

The disk $b$ is firmly mounted on the shaft A, while the disk $b'$ is secured to the same by means of a feather-key, $c$, so that it can move toward and from the disk $b$ without being allowed to revolve independent of the shaft.

To the inner surface of the disk $b$ are secured two (or more) springs, $d$, from the loose ends of which extend screw-bolts $e$, provided with nuts $f$.

The disk $b'$ is provided with holes to receive the bolts $e$, and, by applying the nuts $f$, both disks can be drawn up against their seats with a yielding power dependent upon the tension of the springs $d$.

By turning the nuts in one direction, the tension of these springs is increased, and *vice versa*, and the power required to turn the pulley B on the disks $b\ b'$ can thus be regulated to correspond to a certain maximum resistance.

If the shaft A is used to transmit motion imparted to it by a belt running on the pulley B, and the resistance offered to the revolution of said shaft exceeds the fixed limit, said shaft will remain stationary, and the pulley will revolve on the disks $b\ b'$.

It is obvious that the same effect will be produced if the pulley B is made in the form of a cog-wheel, so that it can be driven by another cog-wheel instead of by a belt.

By providing the pulley with two internal conical seats fitting on disks which are drawn up against said seats by a yielding force, the face of the pulley is always kept parallel with its shaft; whereas, if said pulley is provided with a single conical seat, the disk, on being forced into this seat, has a tendency to throw said pulley in an oblique position, which is objectionable, and in some cases detrimental, to the correct operation of said pulley.

Another advantage of my friction-pulley is, that the springs are situated in its interior, where they are out of the way, and their tension can be regulated by simple screw-bolts.

What I claim as new, and desire to secure by Letters Patent, is—

1. The arrangement of two cone-seats in the opposite sides of a pulley or cog-wheel, fitting on disks $b\ b'$, which are capable of moving toward and from each other, without being allowed to revolve independent of the shaft on which they are mounted, substantially as described.

2. The springs $d$, on the inner surface of one of the disks $b$ or $b'$, in combination with bolts $e$ and a pulley, B, fitting on said disks, substantially as set forth.

JOSEPH STEGER.

Witnesses:
W. HAUFF,
C. WAHLERS